US005415064A

United States Patent [19]

Chang

[11] Patent Number: 5,415,064

[45] Date of Patent: May 16, 1995

[54] ADJUSTABLE WRENCH

[76] Inventor: Chung-Hshing Chang, No. 5, Chang Ma Street, Ma Hsing Village, Shiow Shoei Shi, Chang Huah, Taiwan, Prov. of China

[21] Appl. No.: 213,510

[22] Filed: Mar. 16, 1994

[51] Int. Cl.$^{6}$ .............................................. B25B 13/16

[52] U.S. Cl. .......................................... 81/166; 81/175

[58] Field of Search .......................... 81/155, 164–172, 81/175

[56] References Cited

U.S. PATENT DOCUMENTS

| | | | |
|---|---|---|---|
| 2,376,764 | 5/1945 | Flower | 81/166 |
| 4,520,699 | 6/1985 | Jeremic | 81/166 |
| 4,787,275 | 11/1988 | Colvin | 81/170 X |
| 4,838,132 | 6/1989 | Pyles | 81/166 X |
| 4,909,107 | 3/1990 | Jeremic | 81/166 |
| 4,967,613 | 11/1990 | Cone | 81/166 |

FOREIGN PATENT DOCUMENTS

| | | | |
|---|---|---|---|
| 169314 | 9/1921 | United Kingdom | 81/166 |

*Primary Examiner*—D. S. Meislin

*Attorney, Agent, or Firm*—Browdy and Neimark

[57] ABSTRACT

An adjustable wrench has a handle and a head formed integrally at the anterior end of the handle. The head is provided with a fitting hole, a receiving hole, and a through hole in communication with the fitting hole. Located at two opposite sides of the fitting hole are two fixed clamping surfaces. A rotation knob is disposed in the receiving hole. An adjustment bolt is put through the through hole and the ring hole of the rotation knob such that one end of the adjustment bolt is received in the fitting hole. The one end of the adjustment bolt is provided with a movable clamping surface forming a clamping space in conjunction with the two fixed clamping surfaces. The ring hole of the rotation knob is provided with threads engageable with threads of the adjustment bolt. A location pin is fastened to the head such that the locating pin is inserted into a groove extending axially in the adjustment bolt. When the rotation knob is turned, the adjustment bolt is caused to move linearly to adjust the position of the movable clamping surface.

4 Claims, 2 Drawing Sheets

ADJUSTABLE WRENCH

FIELD OF THE INVENTION

The present invention relates generally to a wrench intended for use in wrenching a hexagonal nut or a bolt head, and more particularly to an adjustable wrench provided with means for adjusting easily the dimension of its clamping hole.

BACKGROUND OF THE INVENTION

The conventional adjustable wrench is generally provided with a fixed jaw and a movable jaw, which form together a clamping mouth for fastening or loosening a fastener such as a hexagonal nut or bolt head. Such a prior art adjustable wrench as described above is defective in design in that it often fails to hold a nut or bolt head firmly at the time when the nut or the bolt head is twisted strenuously, and that the movable jaw is vulnerable to a crack.

SUMMARY OF THE INVENTION

It is therefore the primary objective of the present invention to provide an improved adjustable wrench with means to facilitate the adjustment of the dimension of its clamping hole to fit the hexagonal nuts or bolt heads of various dimensions.

It is another objective of the present invention to provide an improved adjustable wrench with three symmetrical clamping surfaces for holding firmly a hexagonal nut or bolt head intended to be tightened or loosened.

The foregoing objectives of the present invention are attained by the improved adjustable wrench which has a handle and a head formed integrally at one end of the handle. The head is provided with a fitting hole, a receiving hole, and a through hole passing through the receiving hole to communicate with the fitting hole. Located at two opposite sides of the fitting hole are two fixed clamping surfaces. A rotation knob is disposed in the receiving hole. An adjustment bolt is put through the through hole and the ring hole of the rotation knob such that one end of the adjustment bolt is received in the fitting hole. The one end of the adjustment bolt is provided with a movable clamping surface which is intended to form with the two fixed clamping surfaces a clamping space. The ring hole of the rotation knob is provided with threads engageable with the threads of the adjustment bolt. A locating pin is fastened to the head such that the locating pin is inserted into a groove extending axially in the adjustment bolt. When the rotation knob is turned, the adjustment bolt is caused to move linearly to adjust the position of the movable clamping surface.

DETAILED DESCRIPTION OF THE INVENTION

Figure 1:
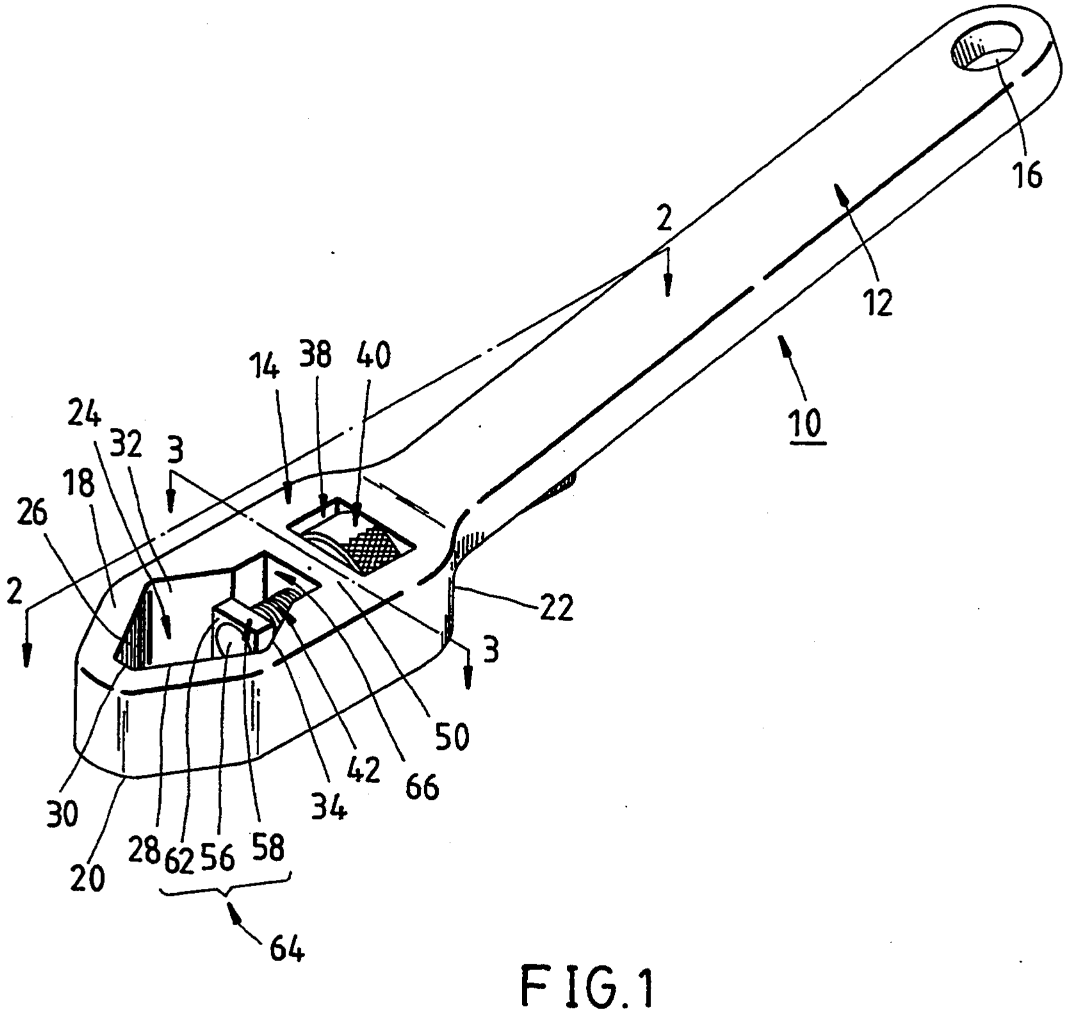
FIG. 1 shows a perspective view of a preferred embodiment of the present invention.
Figure 2:
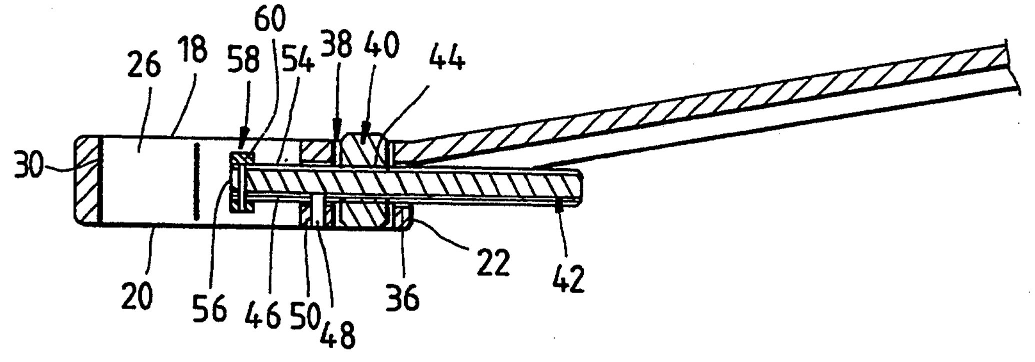
FIG. 2 shows a sectional view of a portion taken along the line 2—2 as shown in FIG. 1.
Figure 3:
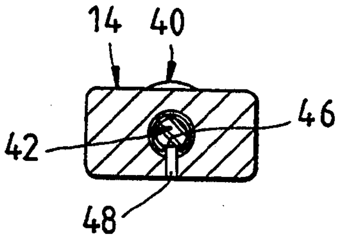
FIG. 3 shows a sectional view of a portion taken along the line 3—3 as shown in FIG. 1.
Figure 4:
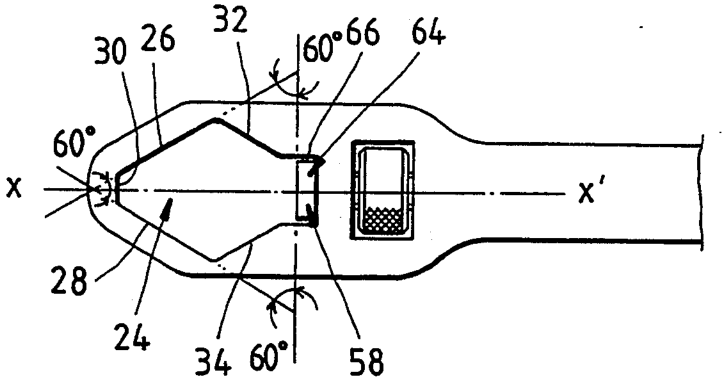
FIG. 4 shows a top plan view of the preferred embodiment of the present invention.

Referring to FIGS. 1-6, an adjustable wrench 10 embodied in the present invention is shown to comprise a handle 12 and a rectangular head 14 formed integrally at one end of the longitudinal axis of the handle 12. Located at another end of the longitudinal axis of the handle 12 is a hang hole 16.

The head 14 has an upper surface 18 and a lower surface 20, which are parallel to each other. The distance between the upper and the lower surfaces 18 and 20 is greater than the thickness of the handle 12. The longitudinal axis of the handle 12 has one end that is connected with one end of the longitudinal axis of the head 14 so as to form a shoulder surface 22 at the junction between the handle 12 and the head 14. In this preferred embodiment of the present invention, the handle 12 is slanted upwards at a predetermined angle, such as an angle of 15 degrees, from the junction between the handle 12 and the head 14 for facilitating the wrenching operation.

The head 14 is provided with a fitting hole 24 having two fixed clamping surfaces 26 and 28 which are opposite in location to each other and are located at one end farther from the handle 12. These two fixed clamping surfaces 26 and 28 are located on opposite sides of the longitudinal axis X–X' of the head 14 such that the two fixed clamping surfaces 26 and 28 are equidistant from the axis X–X'. The two abstract extension surfaces, as shown by the dotted lines in FIG. 4, of the two fixed clamping surfaces 26 and 28 meet at an angle of 60 degrees. In addition, this preferred embodiment of the present invention is provided with a top surface 30 perpendicular to the longitudinal axis X–X' of the head 14. The top surface 30 is respectively connected with one end of each of the two fixed clamping surfaces 26 and 28, with another end of each of the two fixed clamping surfaces 26 and 28 being connected respectively with two inner surfaces 32 and 34.

The head 14 is provided with a through hole 36 which is located between the hole surface of the fitting hole 24 and the shoulder surface 22 and is parallel to or coaxial with the longitudinal axis X–X'. Located between the end of the fitting hole 24 near the handle 12 and the handle 12 is a receiving hole 38 in communication with the through hole 36. A rotation knob 40 is disposed in the receiving hole 38. An adjustment bolt 42 is disposed through the through hole 36 and the ring hole 44 of the rotation knob 40 such that one end of the adjustment bolt 42 is received in the fitting hole 24. The adjustment bolt 42 is provided therein axially with a groove 46. A locating pin 48 is fastened to a partition wall 50 located between the fitting hole 24 and the receiving hole 38, with the inner end of the locating pin 48 being received in the through hole 36 and being retained in the groove 46. The ring hole 44 of the rotation knob 40 is provided with threads engageable with threads of the adjustment bolt 42. When the rotation knob 40 is turned, the adjustment bolt 42 is caused to move linearly in the direction of the axis thereof. It is suggested that the dimension of the rotation knob 40 is such that the surface of the rotation knob 40 is higher than the upper surface 18 of the head 14 when the rotation knob 40 is disposed in the receiving hole 38. Such an arrangement of the rotation knob 40 as described above is intended to facilitate the turning of the rotation knob 40.

The adjustment bolt 42 has a penetration end 54 located in the fitting hole 24 and provided with a flat end surface 56. An arresting block 58 has a through hole 60 in which the penetration end 54 is held. A top side surface 62 is coplanar with the flat end surface 56. The top side surface 62 and the flat end surface 56 form a movable clamping surface 64 having on both sides thereof two abstract extension surfaces, which meet respectively the two abstract extension surfaces of the two fixed clamping surfaces 28 and 26 at an angle of 60 degrees, as shown by the dotted lines in FIG. 4. Therefore, the fitting hole 24 is composed of two fixed clamping surfaces 26 and 28, and the movable clamping surface 64, which are corresponding respectively in location to three noncontiguous sides of a hexagonal nut or bolt head and which form together a clamping space adjustable in dimension to accommodate a number of hexagonal nuts or bolt heads of various dimensions. The preferred embodiment of the present invention is provided with the penetration end 54 having the arresting block 58 which serves to enlarge the area of the movable clamping surface 64. Of course, the addition of the arresting block 58 is optional, depending on the size of the hexagonal nuts or bolt heads to be worked on with the adjustable wrench of the present invention. In addition, the space of the fitting hole 24 can be enlarged by a recess 66 located at the end adjacent to the handle 12 and dimensioned to accommodate therein the arresting block 58.

Figure 5:
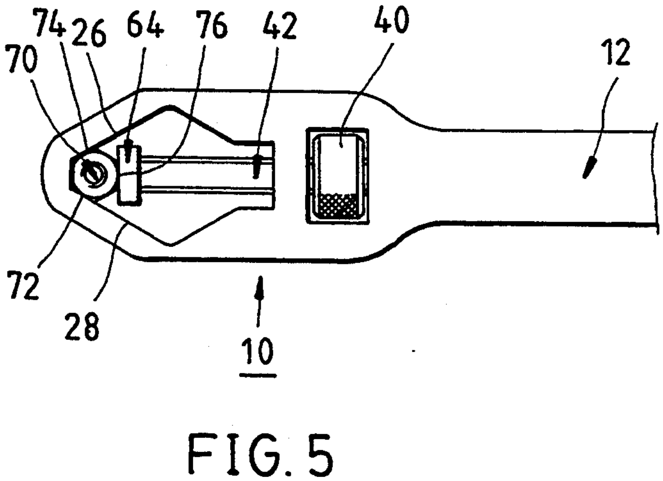
FIG. 5 is a top plan view of the preferred embodiment in use under a first condition, according to the present invention.
Figure 6:
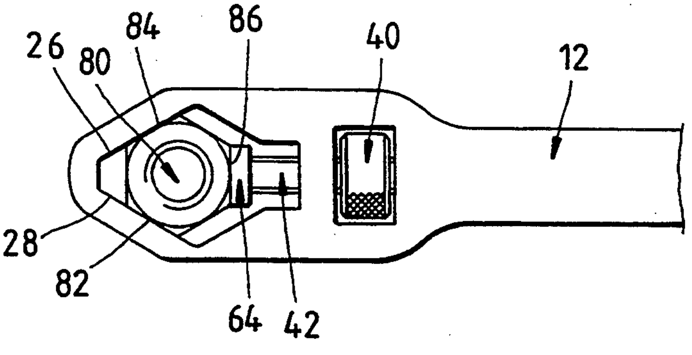
FIG. 6 shows a top plan view of the preferred embodiment in use under a second condition, according to the present invention.

When a hexagonal nut 70 or bolt head 80 is to be worked on with the adjustable wrench 10 of the present invention, as shown respectively in FIGS. 5 and 6, the fitting hole 24 is first fitted over the nut 70 or the bolt head 80 such that the fixed clamping surfaces 26 and 28 of the wrench 10 are respectively in contact with the opposite sides 72 and 74 of the nut 70 or with the opposite sides 82 and 84 of the bolt head 80. Thereafter, the rotation knob 40 is turned until such time when the movable clamping surface 64 of the adjustment bolt 42 of the wrench 10 is intimately in contact with a lower side 76 or 86 of the hexagonal nut 70 or bolt head 80. As a result, the nut 70 or the bolt head 80 can be turned in the direction of a wrenching movement of the handle 12.

It is readily apparent that the adjustable wrench 10 of the present invention has inherent advantages over the prior art adjustable wrench. The adjustable wrench 10 of the present invention is provided with a rotation knob 40 which makes the job of adjusting the size of the clamping space relatively easy. In addition, the clamping space of the adjustable wrench 10 of the present invention is formed by three clamping surfaces which meet respectively at an angle of 60 degrees. As a result, a hexagonal nut or bolt head can be held securely in the clamping space of the adjustable wrench 10 of the present invention. Moreover, the torsion of a wrenching movement of the handle 12 of the adjustable wrench 10 of the present invention is equally exerted on the three clamping surfaces, which are therefore less vulnerable to a crack caused by a strenuous twist of the hexagonal nut or bolt head.

What is claimed is:

1. An improved adjustable wrench comprising:

a handle:

a head formed integrally at one end of the longitudinal axis of said handle and provided with an upper surface, a lower surface parallel to said upper surface, and a fitting hole penetrating said upper surface and said lower surface, said fitting hole having two fixed clamping surfaces opposite in location to each other, said two fixed clamping surfaces having two abstract extension surfaces which extend in a direction opposite to said handle and which meet at an angle of 60 degrees;

an adjustment bolt fastened to said head such that said adjustment bolt can be caused to move linearly along an axis thereof, and that a penetration end of said adjustment bolt is received in said fitting hole, with said penetration end being provided with a movable clamping surface movable with said adjustment bolt and perpendicular to said upper surface and said lower surface of said head so that said movable clamping surface has an abstract extension surface which meets each of said two abstract extension surfaces of said two fixed clamping surfaces at an angle of 60 degrees; and said head further provided with a receiving hole contiguous to a path of a linear movement of said adjustment bolt, and with a rotation knob disposed in said receiving hole such that an outer surface of said rotation knob remains at a level higher than said upper surface of said head, and that a ring hole of said rotation knob receives therein said adjustment bolt having thereon threads engageable with threads of said ring hole of said rotation knob, thereby enabling said adjustment bolt to move linearly and axially at such time when said rotation knob is turned, wherein said handle extends posteriorly from a junction between said head and said handle at a predetermined angle, wherein said upper surface and said lower surface of said head are separated by a distance greater than a distance between an upper surface and a lower surface of said handle; wherein said junction is provided with a shoulder surface; and wherein said head is provided with a through hole which is located between said shoulder surface and a hole surface of said fitting hole and is in communication with said receiving hole, with said adjustment bolt being disposed in said through hole such that said adjustment bolt can be caused to move linearly in the direction of an axis of said through hole, wherein said adjustment bolt is provided with a groove extending in the direction of an axis thereof and retaining therein one end of a location pin fastened to said head such that said one end thereof is inserted into said through hole so as to permit said adjustment bolt to move linearly and axially only in said through hole at such time when said rotation knob is turned.

2. The improved adjustable wrench of claim 1 wherein said two fixed clamping surfaces are located respectively on two sides of a longitudinal axis of said head such that said two fixed clamping surfaces are equidistant from said longitudinal axis; and wherein said axis of said through hole is parallel to said longitudinal axis of said head.

3. The improved adjustable wrench of claim 2 wherein said penetration end of said adjustment bolt has a flat end surface which is perpendicular to an axis of said adjustment bolt and is provided with an arresting block fastened thereto, said arresting block having a top end surface coplanar with said flat end surface of said penetration end of said adjustment bolt for cooperating with said flat end surface to form a movable clamping surface.

4. The improved adjustable wrench of claim 3 wherein said head has a recess portion which is dimensioned to receive therein said arresting block and is located in one end of said fitting hole contiguous to an anterior end of said handle.

* * * * *